United States Patent
Vickery et al.

(10) Patent No.: US 6,684,622 B2
(45) Date of Patent: Feb. 3, 2004

(54) ROCKET EXHAUST PLUME SIGNATURE TAILORING

(75) Inventors: Charles A. Vickery, Corona Del Mar, CA (US); Jerry N. Mason, Redlands, CA (US); William D. Kruse, Redondo Beach, CA (US); Mark Olmos, Upland, CA (US)

(73) Assignee: Northrop Grumman Corporation, Redondo Beach, CA (US)

(*) Notice: Subject to any disclaimer, the term of this patent is extended or adjusted under 35 U.S.C. 154(b) by 0 days.

(21) Appl. No.: 10/085,501

(22) Filed: Feb. 26, 2002

(65) Prior Publication Data

US 2003/0159426 A1 Aug. 28, 2003

(51) Int. Cl.[7] ................................ F02K 9/97
(52) U.S. Cl. ................ 60/205; 60/264; 60/770; 239/265.15
(58) Field of Search ............... 60/205, 770, 264, 60/219; 239/265.15

(56) References Cited

U.S. PATENT DOCUMENTS

| | | | |
|---|---|---|---|
| 3,309,874 A | * 3/1967 | Gould | 60/253 |
| 3,354,651 A | * 11/1967 | Novotny | 60/258 |
| 3,613,583 A | * 10/1971 | Lai et al. | 102/336 |
| 3,733,828 A | 5/1973 | Brown | |
| 3,774,871 A | 11/1973 | Semmes et al. | |
| 3,946,555 A | * 3/1976 | Goede | 60/207 |
| 4,209,351 A | 6/1980 | Pierce et al. | |
| 4,384,454 A | * 5/1983 | Engl | 60/245 |
| 4,452,039 A | * 6/1984 | Hodgkins et al. | 60/207 |
| 4,644,745 A | 2/1987 | Wagner | |
| 5,241,436 A | * 8/1993 | Kawabata et al. | 360/97.01 |
| 5,251,436 A | 10/1993 | Brogan | |
| 5,440,993 A | 8/1995 | Osofsky | |
| 5,746,047 A | 5/1998 | Steyer et al. | |
| 6,054,521 A | 4/2000 | Nelson et al. | |
| 6,125,763 A | 10/2000 | Kline et al. | |
| 6,308,514 B2 | 10/2001 | Haggander et al. | |

* cited by examiner

Primary Examiner—Ehud Gartenberg
(74) Attorney, Agent, or Firm—Tarolli, Sundheim, Covell & Tummino L.L.P.

(57) ABSTRACT

Methods and arrangements for tailoring rocket exhaust plume signatures of rocket exhaust systems are disclosed. The tailoring of the rocket exhaust plume signature is accomplished by providing and locating at least one structure having materials and/or additives that modify the radiant intensity pattern of the rocket exhaust plume upon ablation or melting into the rocket exhaust plume. The materials and/or additives can be manufactured or incorporated into preexisting ablative materials of the rocket exhaust system or be provided as stand-alone structures.

25 Claims, 6 Drawing Sheets

ROCKET EXHAUST PLUME SIGNATURE TAILORING

FIELD OF THE INVENTION

The present invention relates to fuel-propelled vehicles and, more particularly, to internal methods and arrangements for tailoring rocket exhaust plume signatures of fuel-propelled vehicles.

BACKGROUND OF THE INVENTION

Fuel-propelled vehicles, such as rockets and missiles utilize rocket motors to propel the vehicle through air and space. The rocket motors general fall into three types, which are solid propellant motors, liquid propellant motors and hybrid propellant motors. Solid propellant motors utilize a solid fuel element or grain that is placed in a large solid combustion chamber. The solid fuel element or grain is usually bonded to the combustion chamber walls and burns away during flight. The liquid propellant motors employ liquid fuel tanks coupled to a fixed combustion chamber through one or more fuel lines. A hybrid propellant motor generally uses a fluid reactant (e.g., an oxidizer) to burn a solid fuel element or a fluid fuel element with a solid reactant, which are ignited in a combustion chamber.

Typically, the combustion chamber is connected to a nozzle assembly regardless of the type of rocket motor being employed. The purpose of the nozzle is to provide thrust to the vehicle by accelerating the mass of the propellants (fuel and oxidizer). The nozzle can be a supersonic nozzle with a subsonic portion and a supersonic portion. The subsonic portion is connected to the combustion chamber, while the supersonic portion opens to the outside environment. The propellant is ignited in the combustion chamber producing gases moving at subsonic speeds. The gas is then accelerated to supersonic speed by the subsonic portion of the nozzle which decreases in diameter as the gas passes through the nozzle. The gas then reaches supersonic speed and enters the supersonic portion of the nozzle which increases in diameter as the gas passes through the nozzle and exits into the environment.

The nozzle is formed from a liner and an overwrap structure for strength. The thickness of the liner is substantially greater (e.g., 90%) than the thickness of the overwrap structure. The liner insulates the overwrap structure from the heat during combustion, so that the nozzle can survive the heat from the exhaust plume during operation. The liner is formed from an ablative material, such that portions of the liner melt over time during the flight. The energy of melting the liner absorbs some of the heat from the nozzle. Additionally, the melted portions are exhausted carrying away some of the heat from the nozzle.

Chemical vehicle propulsion systems maximize performance by converting the chemical energy of a propellant into thermodynamic energy in the form of high temperature and high-pressure gases. For example, expanding the high temperature gases through a supersonic nozzle to atmospheric conditions generates a maximum thrust per pound of the propellants being utilized to drive the vehicle. Conventional rockets and missiles minimize the amount of mass expended internally to provide thermal protection of the motor/thrust high temperature components. Therefore, when designing a rocket or missile vehicle, the propellants are usually selected to maximize the high-energy release per pound, and the thermal protection materials are selected based on minimal weight and maximum thermal protection per pound. These types of propellants usually contain toxic materials (e.g., acidic compounds, oxides of toxic minerals) that are detrimental to the environment.

Target vehicles are utilized in testing rocket and missile defense systems. These target vehicles simulate an enemy vehicle so that the rocket and missile defense system can be tested prior to implementation into the field. The rocket and missile defense systems employ optics and/or infrared technology to track and destroy the target vehicle. The target vehicles operate in a similar manner to the enemy vehicles but do not carry any explosives. Additionally, due to environmental concerns, the propellants utilized in the target vehicles are nontoxic propellants. Therefore, the plume signature of a target vehicle is generally weaker than the plume signature for the actual vehicle that the target vehicle is simulating.

BRIEF SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention relates to methods and arrangements for tailoring rocket exhaust plume signatures of rocket exhaust systems. The tailoring of the rocket exhaust plume signature is accomplished by providing and locating at least one structure having materials and/or additives that modify the radiant intensity pattern of the rocket exhaust plume upon ablation or melting into the rocket exhaust plume. The materials and/or additives can be manufactured or incorporated into preexisting ablative materials of the rocket exhaust system or be provided as stand-alone structures.

In one aspect of the invention, the material or additives can be selected to provide a desired plume signature by configuring the materials in a specific manner. The materials or additives can be configured to provide ablation gradients in the ablating structure. The ablation gradients define the varying effects of the configured plume modifying materials on the radiant intensity of the exhaust plume. Therefore, plume signature tailoring can be achieved by structurally varying materials and/or compositions of different materials or additives within the ablating structure to modify (e.g., enhance, reduce, resonate) the radiant intensity or infrared signature associated with the exhaust plume.

In one aspect of the invention, the fuel-propelled vehicle is a self-propelled vehicle, such as a missile or rocket. The missile or rocket can be a target vehicle used in testing of missile defense systems. One or more additives can be provided in a nozzle liner that insulates a nozzle overwrap structure to protect the nozzle overwrap structure from the heat of the nozzle exhaust. The one or more additives ablate with the insulating material into the exhaust plume, modifying the radiant intensities of the exhaust plume based on the manner that the additives are configured in the liner. Alternatively, the one or more additives can be provided in jet vanes of the missile or rocket, or in stand alone structures disposed within or near the nozzle exhaust.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
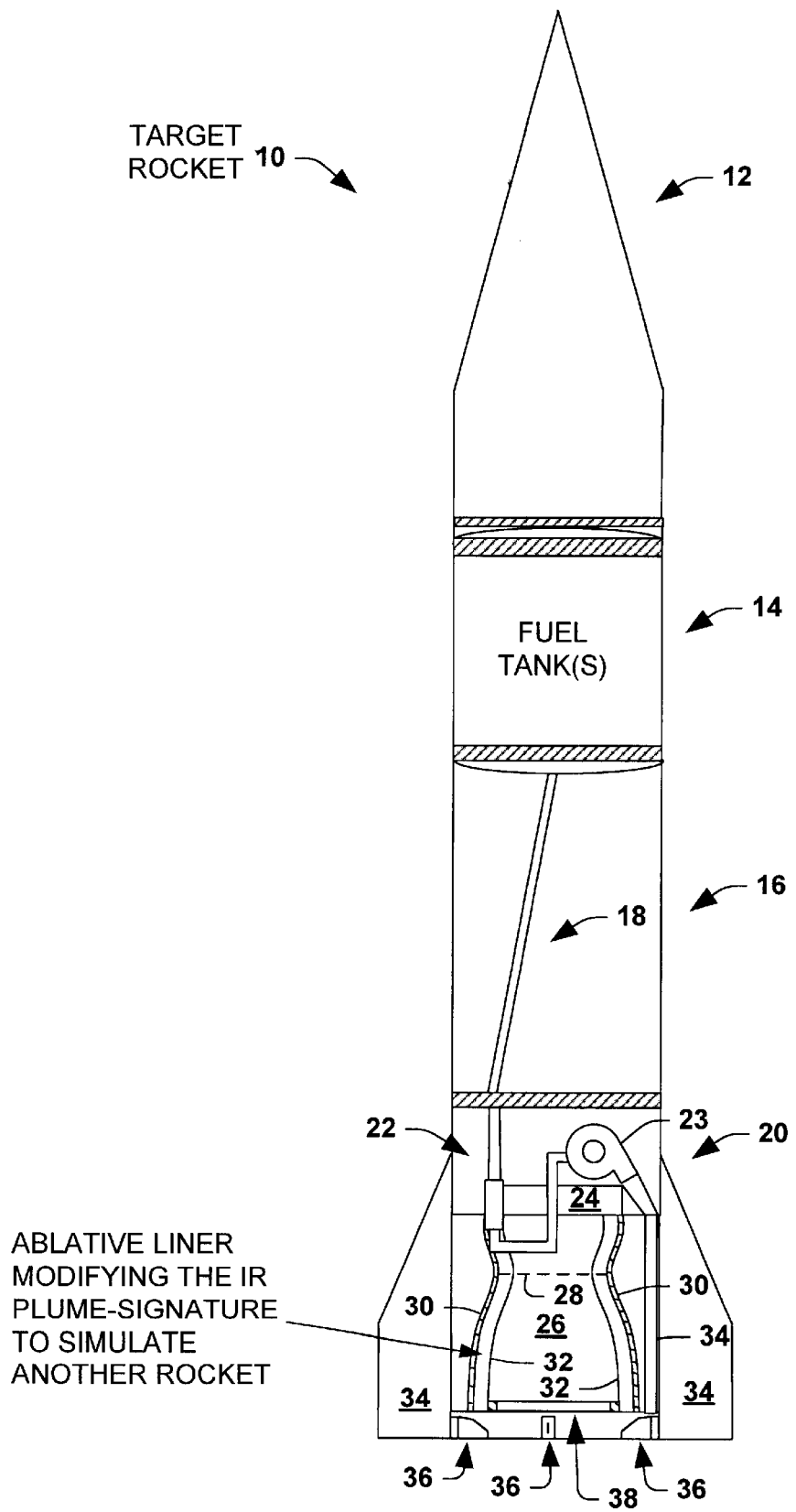
FIG. 1 illustrates a partial cross-sectional view of a rocket system in accordance with an aspect of the present invention.

The present invention relates to internal methods and arrangements for tailoring rocket exhaust plume signatures of fuel-propelled vehicles. The fuel-propelled vehicle can be a self-propelled vehicle, such as a rocket or missile. Alternatively, the fuel-propelled vehicle can be a manned vehicle (e.g., spacecraft, aircraft, rocket powered automobiles). The tailoring of the rocket exhaust plume signature is accomplished by providing and locating at least one structure having materials and/or additives that modify the radiant intensity pattern or exhaust plume signature of the rocket exhaust plume upon the ablation or melting of the material and/or additive into the rocket exhaust plume.

The materials and/or additives can be manufactured or incorporated into preexisting ablative materials that reside within a rocket nozzle and/or beyond a rocket nozzle throat location, such that the material ablates into the rocket exhaust plume during afterburning. The materials or additives can be provided into a nozzle ablative liner, such that the materials or additives ablate along with the liner, thus modifying the exhaust plume signature. Alternatively, the materials or additives can be coated or incorporated into jet vanes residing outside the nozzle exhaust exit. A material structure such as a ring can be fabricated and located inside the nozzle beyond the nozzle throat location, or located outside the nozzle exhaust exit. It is to be appreciated that other structures located within or near the exhaust plume during afterburning can be employed alone or in combination to carry out the present invention.

The material or additives can be selected to provide a desired plume signature by providing the ablating structure with specific ablation rates. The ablation rates can be defined as the amount of plume signature modifying material that ablates into the plume over time to vary the effect of the plume signature modifying material on the radiant intensity of the plume over time. Plume signature profiles can be defined by selecting material configurations that define ablation gradients according to ablation rates. Therefore, plume signature profiles can be provided by varying any of material types, material compositions, material densities, material geometries and material ablation rates.

The material or additives can be selected to provide a desired plume signature by providing ablation gradients in the ablating structure. The ablation gradients define the varying effects of the plume modifying materials on the radiant intensity of the exhaust plume, so that simulation of an exhaust plume for other vehicle types can be achieved. Therefore, tailoring can be achieved by structurally varying materials and/or compositions of different materials or additives within the ablating structure to modify (e.g., enhance, reduce, resonate) the radiant intensity or infrared signature associated with the exhaust plume. It is to be appreciated that the ablation gradient can be a constant by providing a plume modifying material in an ablating structure in a uniform manner.

The present invention can be employed in a target vehicle that simulates an actual rocket or missile. The target vehicle can use non-toxic propellant, which typically reduces the radiant intensity associated with the exhaust plume of the target vehicle. The present invention provides materials that ablate into the exhaust plume, thus modifying (e.g., enhancing, reducing, resonating) the radiant intensity or signature characteristics of the exhaust plume to simulate an actual or enemy vehicle. The target vehicle then becomes ideally suited for testing missile defense systems.

In the following description, for purposes of explanation, numerous examples are set forth in order to provide a thorough understanding of the present invention. It may be evident, however, that the present invention may be practiced in other examples not set forth in the following description.

FIG. 1 illustrates a rocket system 10 that employs materials and/or additives for controlling and/or adjusting a plume signature in accordance with an aspect of the present invention. The rocket system 10 can be employed as a target rocket utilized in testing rocket and missile defense systems. The target rocket can utilize environmentally safe nontoxic propellants, which create an exhaust plume having a generally weaker radiant intensity than exhaust plumes of actual rockets. The present invention provides for control, adjustment and/or tailoring of the exhaust plume, so that simulation of an actual rocket or missile exhaust plume signature can be obtained. Therefore, improved simulation of rockets and missiles can be obtained for meeting the military requirements associated with optics and/or infrared components of missile defense systems, which need to be tested prior to implementation into the field. However, the present invention is applicable to any system that desires to modify the plume signature of a rocket exhaust.

The rocket system 10 includes a front end portion 12 and a fuel tank portion 14. The fuel tank portion 14 includes one or more fuel tanks (e.g., liquid fuel tanks). A central portion 16 connects the fuel tank portion 14 to an engine bay 20. A fuel line 18 extends from the fuel tank portion 14 through the central portion 16 to the engine bay 20. The central portion 16 provides separation of the fuel from combustion that occurs in the engine bay 20. The engine bay 20 includes a rocket motor or booster system 22 coupled to a nozzle assembly 26. The rocket motor or booster system 22 includes an engine or pump system 23 that delivers fuel into a combustion chamber 24. It is to be appreciated that if the rocket system 10 were a solid propellant rocket system, the fuel tank portion 14 and the central portion 16 would be integrated into a single solid propellant chamber connected to the nozzle assembly 26 through the combustion chamber 24. Alternatively, the combustion chamber 24 would be integrated into a single solid propellant chamber.

The nozzle assembly 26 includes a bell shaped nozzle with one end connected to the combustion chamber 24 and the other end providing an exit for the exhaust plume. The rocket system 10 includes fins 34 mounted to the exterior of the engine bay 20 and jet vanes 36 mounted to the interior of the engine bay 20 outside of the outer or exit portion of the nozzle assembly 26. The fins 34 and the jet vanes 36 facilitate steering and guidance of the rocket system 10. The fins 34 and jet vanes 36 are controllable by a guidance computer or guidance system (not shown). The nozzle assembly 26 can be a supersonic nozzle with a subsonic portion connected to the combustion chamber 24 and a supersonic portion that opens to the outside environment.

The nozzle assembly 26 includes an ablative liner 32 and an overwrap layer 30 for strength. The overwrap layer 30 is typically formed of a metal (e.g., titanium) or a high strength composite (e.g., carbon fiber), which is protected or insulated from the exhaust plume during afterburning by the ablative liner 32. The ablative liner 32 includes one or more additives for modifying the plume signature of the rocket 10. The subsonic portion and the supersonic portion of the nozzle 26 are separated by a throat 28. The one or more additives are integrated into the entire ablative liner 32 or integrated into a portion of the ablative liner 32 from the throat 28 to the exit of the nozzle 26. The one or more additives can be integrated into the ablative liner 32 during fabrication of the ablative liner 32.

For example, the ablative liner materials and plume modifying additives can be integrated into a single liner by bonding the materials together to form the liner, mixing the materials and molding the materials into a single integrated piece by using a die or mold and/or pressing the materials together. It is to be appreciated that many other techniques for combining the liner materials and the plume modifying materials or additives can be employed in accordance with the present invention.

A typical nozzle liner is comprised of phenolics (e.g., silica phenolic, graphite phenolic) and epoxy resins combined with carbon and/or silica fabrics. Often additives or fillers are provided to make the materials less dense or more elastomeric. The present invention selects additives or fillers based on the chemical needs of the plume for infrared tailoring (e.g., enhancement, reduction, resonation). For example, some materials that can be provided as additives include magnesium, aluminum, magnesium-polytetrafluoroethylene (manufactured by Dupont de Nemours and marketed under the trade name TEFLON®), carbon and other energetic solid particles. Adding aluminum particles as additives to the plume has the effect of brightening or enhancing the radiant intensity of the exhaust plume. Magnesium particles enhance the radiant intensity of the plume even more than the aluminum particles. The TEFLON® particles increase the energy level of the magnesium during afterburning. Carbon particles resonate at specific wavelengths or infrared bands during afterburning. The particular materials and/or material combinations can be selected to achieve a desired exhaust plume signature.

It is to be appreciated that a variety of different plume signature types can be achieved by selecting particular material additive combinations. Tailoring of the plume signatures can be further achieved by the distribution of additive particles throughout the ablative liner. Furthermore, the overall density and composition can be varied with time by imposing gradients according to ablation rates. It is to be appreciated that other particle types and/or combination of particle types can be employed to modify and/or tailor the exhaust plume.

In one aspect of the invention, the jet vanes 36 are coated with an ablative material or formed with an additive that can modify and/or tailor the plume signature. The coating or additive can include particles similar to those described with respect to the nozzle liner 32. The jet vanes 36 can be spray coated or be fabricated into the jet vanes 36 in the same manner as the nozzle liner 32. The additives of the jet vanes 36 can modify the signature alone or in combination with additives in the nozzle liner 32.

In another aspect of the invention, a block or ring of material 38 is mounted at a location within or near the exhaust plume during afterburning. The block or ring of material 38 can be mounted inside the nozzle 26 as illustrated in FIG. 1. Alternatively, the block or ring of material 38 can be mounted outside the nozzle exit. The block or ring of material 38 can be a solid material or a material and an additive that modifies the exhaust plume signature. The block or ring of material 38 can be a composition of ablative materials and additives. The material or additives provided in the ring 38 can modify the exhaust plume signature alone or in combination with at least one of the material or additives in the jet vanes 36 and the additives in the nozzle liner 32.

An exhaust plume is formed by gas and heat generated by the combustion in the combustion chamber 24 and exiting the nozzle assembly 26. The exhaust plume ablates or melts portions of the nozzle liner 32 over time. The energy associated with melting the nozzle liner 32 facilitates cooling of the nozzle overwrap 30. Additionally, the melted portions of the liner that are exhausted from the exhaust plume also facilitate cooling of the nozzle overwrap 30. The material and/or additives in the nozzle liner, jet vanes and/or material ring modify (e.g., enhance, reduce, resonate) the exhaust plume signature or infrared characteristics associated with the exhaust plume.

Figure 2:
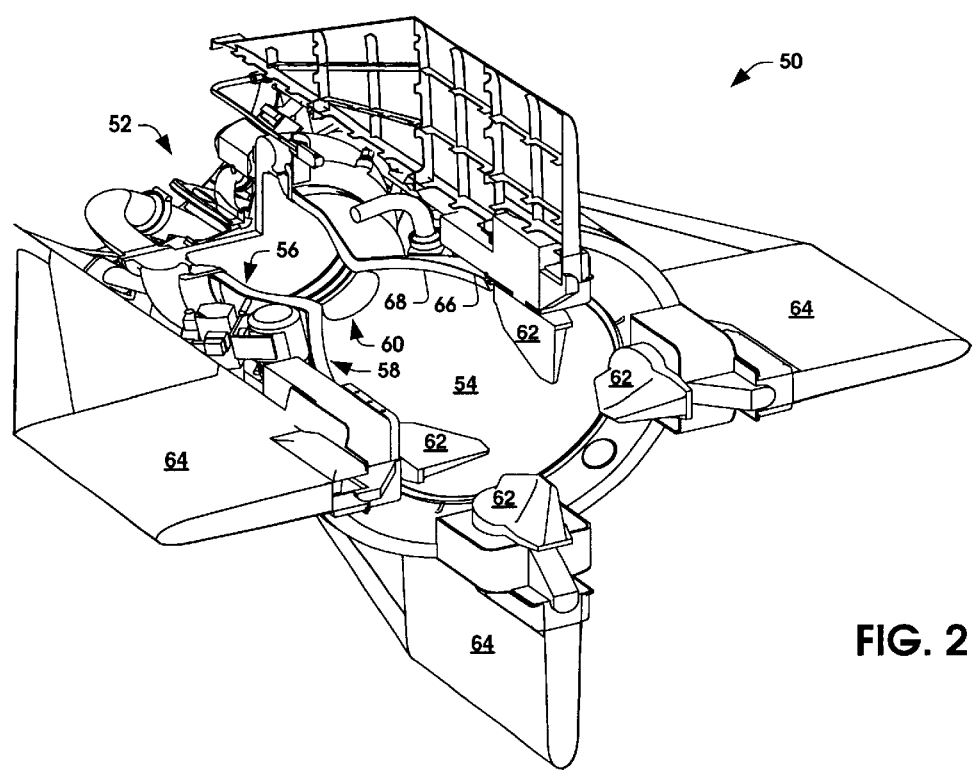
FIG. 2 illustrates a partial cross-sectional perspective view of a rocket engine in accordance with an aspect of the present invention.

FIG. 2 illustrates a partial cross-sectional view of a rocket booster or rocket engine system 50 for a liquid propellant rocket vehicle similar to the one illustrated in FIG. 1 in accordance with an aspect of the present invention. The rocket engine system 50 includes a fuel injection system 52. The fuel injection system 52 can include components such as a fuel inlet line, an engine fuel valve and a turbopump. It is to be appreciated that the fuel injection system 52 can include other parts and components not illustrated in FIG. 2. For example, the fuel injection system 52 can include oxidizer parts and components, cooling parts and components, gas generator start and ignition components and filtering components. Additional components would be apparent to those skilled in the art of rocket engine design.

The fuel injection system 52 provides fuel to a combustion chamber. The fuel propellant is ignited in the combustion chamber producing heated gases moving at subsonic speeds. The gases are provided to a nozzle 54 having a generally bell shape. The nozzle 54 includes a subsonic portion 56 and a supersonic portion 58 separated by a nozzle throat 60. The heated gases associated with the combustion of the fuel are provided to the subsonic portion 56 of the nozzle 54. The heated gases are then accelerated to supersonic speed by the subsonic portion 58 of the nozzle 54, which decreases in diameter as the gas passes through the nozzle 54. The heated gases then reach supersonic speed and enter the supersonic portion 58 of the nozzle 54, which increases in diameter as the gas passes through the nozzle 54 and exits into the environment. Although a supersonic nozzle or bell type nozzle is illustrated in FIG. 2, other types of nozzle (e.g., cone type, annular type) can be employed in accordance with the present invention.

The nozzle 54 is formed of a nozzle overwrap structure 66 and a nozzle liner 68. The overwrap structure 66 is formed from a metal, such as titanium. The nozzle liner 68 is formed from a composite material that includes one or more additives that ablate with the nozzle liner and modify the signature of the exhaust plume. The one or more additives can be integrated into the nozzle liner as particulates and/or fibers. The composition, particle sizes, particle distribution, and overall density of the one or more additives can be varied throughout the nozzle liner (e.g., in layers) to form one or more gradients according to ablation rates to vary the plume signature over time or over the life of the plume signature. Alternatively, the one or more additives can be formed as plugs integrated or pressed into the nozzle liner. The geometry of the plugs can be selected to provide a desired plume signature profile over time.

The rocket engine system 50 includes fins 64 mounted to the exterior of the engine bay and jet vanes 62 mounted to the interior of the engine bay outside of the outer or exit portion of the nozzle 54. It is to be appreciated that the fins can be coated with an ablative material that modifies the plume signature over time. The ablative material can ablate in conjunction with the nozzle liner 68 to facilitate the tailoring of the exhaust plume signature over time. For example, the material coating on the jet vanes 62 can ablate at a slower rate during initial launching and then ablate faster as the rocket employing the rocket engine 50 reaches higher altitudes. Alternatively, the coating on the jet vanes can ablate faster at initial launching to provide an initial enhancement during a first portion of a flight and a reduced enhancement at a second portion of a flight. A variety of nozzle liner configurations and/or jet vane coating configurations can be provided to vary the exhaust plume and simulate different vehicle types.

Although the examples illustrated in FIGS. 1–2 refer to a liquid propellant motor driven vehicle, the present invention is also applicable to tailoring of exhaust plumes for both solid propellant motor driven vehicles and hybrid propellant motor driven vehicles.

Figure 3:
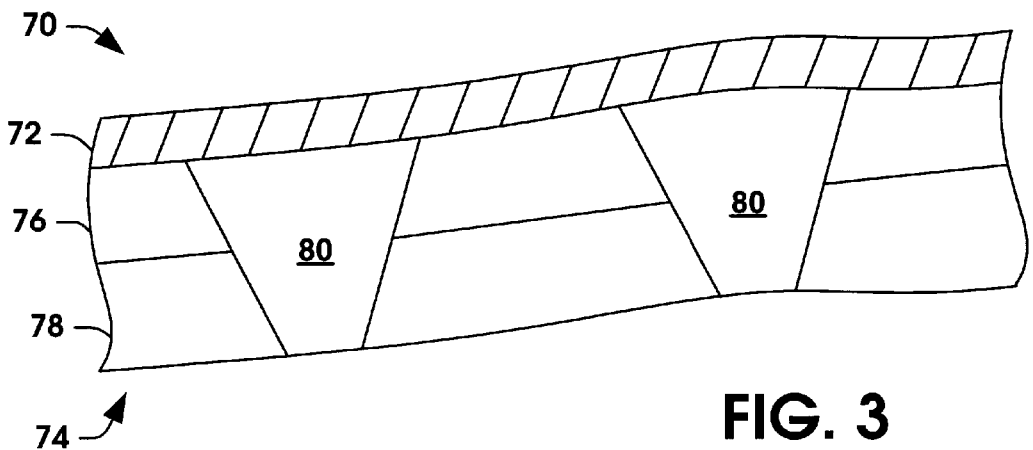
FIG. 3 illustrates an example configuration of a cross-sectional view of a nozzle wall having generally trapezoidal shaped plugs in a nozzle liner in accordance with an aspect of the present invention.

FIGS. 3–6 illustrate various configuration associated with providing materials or additives into the nozzle liner to adjust and/or tailor the exhaust plume. FIG. 3 illustrates an example configuration of a cross-sectional view of a nozzle wall 70 in accordance with one aspect of the present invention. The nozzle wall 70 includes an overwrap layer 72 formed of a metal (e.g., titanium) and a nozzle liner layer 74 formed from one or more ablative materials. The nozzle liner layer 74 includes a first layer 76 formed of silica phenolic and a second layer 78 formed of graphite phenolic. It is to be appreciated that the first layer 76 and the second layer 78 can be formed from a variety of different ablative materials, for example, phenolics and epoxy resins combined with carbon and/or silica fabrics. A plurality of plugs 80 are disposed throughout the liner layer 74 that ablate concurrently with the liner layer 74 during afterburning.

The plugs 80 can be comprised of materials that effect the infrared characteristics or radiant intensity associated with the plume signature, such as magnesium, aluminum, magnesium-polytetrafluoroethylene, carbon and other energetic solid particles. The material selected for the plugs 80 are based on the desired radiant intensity tailoring (e.g., enhancement, reduction, resonation) of the exhaust plume. The plugs 80 in FIG. 3 have a generally trapezoidal shape, such that the ablating or melting of the amount of plug material into the plume during afterburning will increase over time. For example, if the plug 80 is formed from a material that is an enhancer, the radiant intensity of the plume signature will increase over time. If the plug is formed from a material that is a reducer, the radiant intensity of the plume signature will decrease over time.

Figure 4:
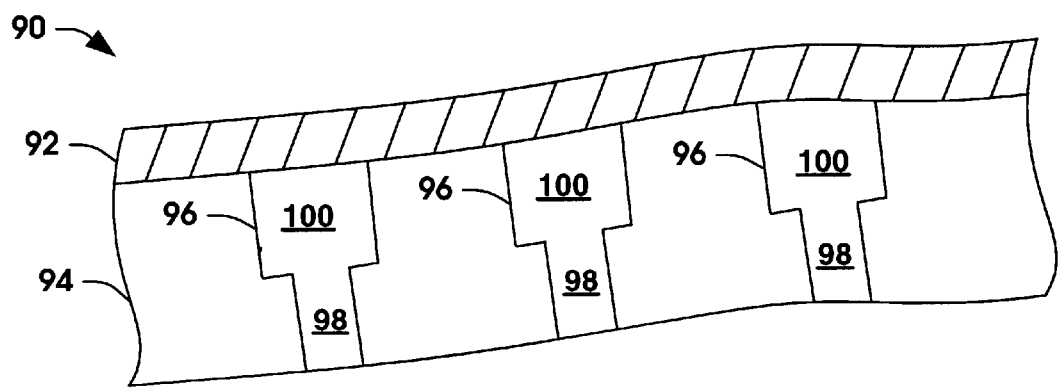
FIG. 4 illustrates an example configuration of a cross-sectional view of a nozzle wall having generally T-shaped plugs in a nozzle liner in accordance with an aspect of the present invention.

FIG. 4 illustrates an example configuration of a cross-sectional view of a nozzle wall 90 in accordance with another aspect of the present invention. The nozzle wall 90 includes an overwrap layer 92 formed of a metal (e.g., titanium) and a nozzle liner layer 94 formed from one or more ablative materials. The nozzle liner layer 94 is formed of a single layer, but can be formed from any number of layers and/or materials to provide a thermal insulator to the metal layer. A plurality of plugs 96 are disposed throughout the liner layer 94 that ablate concurrently with the liner layer 94 during afterburning.

The plugs 96 can be comprised of materials that effect the radiant intensity associated with the plume signature. The material selected for the plugs are based on the desired radiant intensity tailoring (e.g., enhancement, reduction, resonation) of the plume. Additionally, the selected configuration can vary the radiant intensity over the life of the plume. For example, the plugs 96 have a generally T-shape with a smaller lower portion 98 and a larger upper portion 100. The amount of plume modifying material or additive that ablates or melts into the exhaust plume can be defined as the ablation rate of the plume modifying material. Therefore, in the example of FIG. 4, the ablation or melting of the plug material will have a first ablation rate during a first time period and a second ablation rate over a second time period. Since the lower portion 98 has less plume modifying material and the upper portion has more plume modifying material, the variation (e.g., enhancement, reduction, resonation) in the radiant intensity of the exhaust plume will be lower during the first period and higher during the second period.

For example, if the plug 96 is formed from a material that is an enhancer, the infrared plume signature will be increased to a first enhanced state during a first time period while the lower portion 98 ablates, and a second enhanced state during a second time period while the upper portion 100 ablates. The second enhanced state will have a larger effect on the brightness of the radiant intensity than the first enhanced state. If the plug is formed from a material that is an infrared reducer, the infrared plume signature will decrease to a first reduced state during a first time period while the lower portion 98 ablates, and a second reduced state during a second time period, while the upper portion 100 ablates. The second reduced state will have a larger effect on the dimness of the radiant intensity than the first reduced state.

Figure 5:
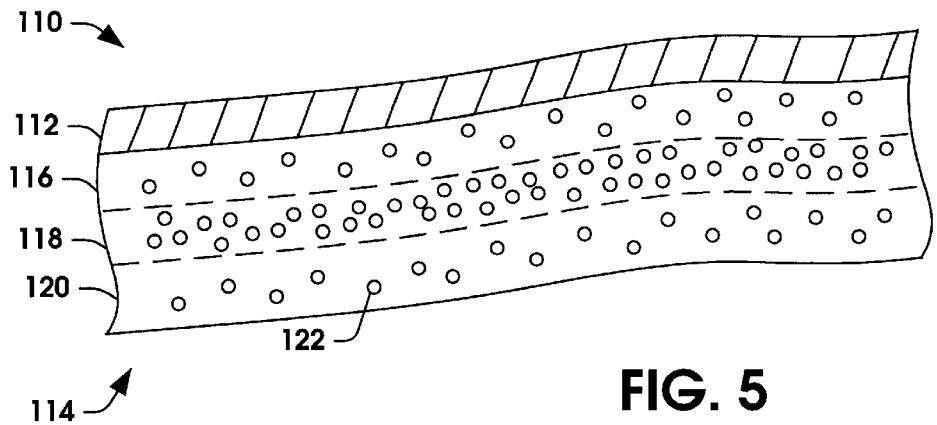
FIG. 5 illustrates an example configuration of a cross-sectional view of a nozzle wall having plume signature modifying material particles with varying particle density in a nozzle liner in accordance with an aspect of the present invention.

FIG. 5 illustrates an example configuration of a cross-sectional view of a nozzle wall 110 that modifies plume signature characteristics by varying particle density of the plume modifying material in accordance with another aspect of the present invention. The nozzle wall 110 includes an overwrap layer 112 formed of a metal (e.g., titanium) and a nozzle liner layer 114 formed from one or more ablative insulating materials. The nozzle liner layer 114 is formed of a first layer 116, a second layer 118 and a third layer 120. The first layer 116, the second layer 118 and the third layer 120 are formed from an ablative insulating material and a plurality of additive particles 122 that modify the plume signature. The nozzle liner 114 can be formed from any number of layers and/or materials to provide a thermal insulator to the overwrap layer 112. The plume modifying materials disposed throughout the liner layer 94 ablate concurrently with the liner layer 94 during afterburning.

The particles 122 are comprised of materials that effect the radiant intensity associated with the plume signature. The material selected for the particles 122 are based on the desired radiant intensity tailoring (e.g., enhancement, reduction, resonation) of the plume. The first layer 116 and the third layer 120 have a first density of plume modifying particles 122. Therefore, the ablation rate of the plume modifying particles 122 will be about the same for the first layer 116 and the third layer 120. The second layer 118 includes a plurality of plume modifying particles 122 at a second density that is more dense than the first density. Therefore, the ablation rate of the first layer 116 and the third layer 120 are about the same, while the ablation rate of the second layer 118 is higher.

The example of FIG. 5 can be employed in an application where it is desired to have a first ablation rate and a third ablation rate during a first portion and a third portion of a flight pattern, and a second ablation rate during a second portion of a flight pattern. For example, in some missile devices the exhaust plume has a first plume intensity in the atmosphere, and a second plume intensity above the atmosphere or in space. Therefore, the configuration of FIG. 5 would be useful in a test vehicle (e.g., simulated vehicle) that has a flight pattern that starts within the atmosphere, travels outside the atmosphere and then finishes back within the atmosphere.

Figure 6:
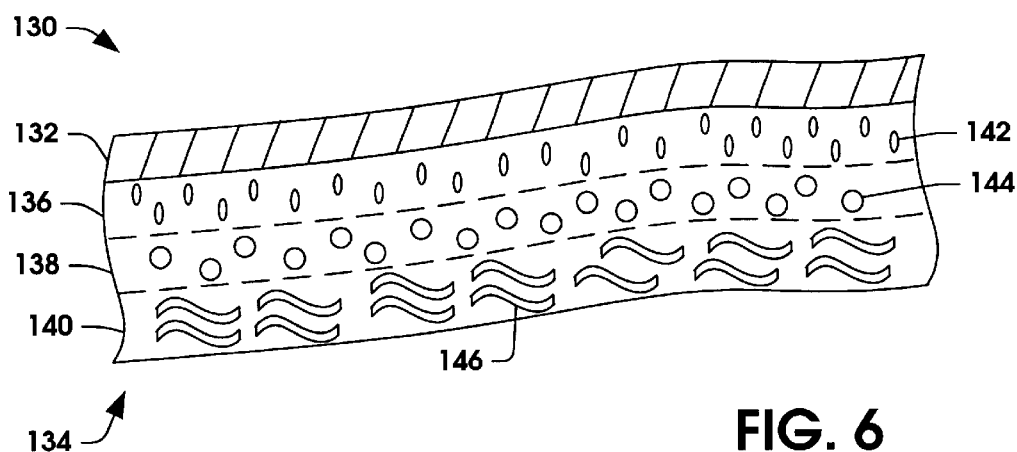
FIG. 6 illustrates an example configuration of a cross-sectional view of a nozzle wall having plume signature modifying materials with varying material types in a nozzle liner in accordance with an aspect of the present invention.

FIG. 6 illustrates an example configuration of a cross-sectional view of a nozzle wall 130 that modifies plume signature characteristics by varying the plume modifying material types in the nozzle liner in accordance with another aspect of the present invention. The nozzle wall 130 includes an overwrap layer 132 formed of a metal (e.g., titanium) and a nozzle liner layer 134 formed from one or more ablative insulating materials. The nozzle liner layer 134 is formed of a first layer 136, a second layer 138 and a third layer 140. The first layer 136, the second layer 138 and the third layer 140 are formed from an ablative insulating material and a plurality of additive particles and/or fibers that modify the plume signature. The nozzle liner 134 can be formed from any number of layers and/or materials to provide a thermal insulator to the overwrap layer 132. The plume modifying materials disposed throughout the liner layer 134 ablate concurrently with the liner layer 134 during afterburning.

The first layer 136 includes particles 142 having a generally oval shape signifying a plume modifying material of a first type. The second layer 138 includes particles 144 having a generally circular shape signifying a plume modifying material of a second type. The third layer 140 includes fiber strands 146 formed from a plume modifying material of a third type. The first type particles 142, the second type particles 144 and the fiber strands 146 each provide different effects to the radiant intensity associated with the plume signature. The material selected for the particles are based on the desired radiant intensity tailoring (e.g., enhancement, reduction, resonation) of the plume.

Figure 7:
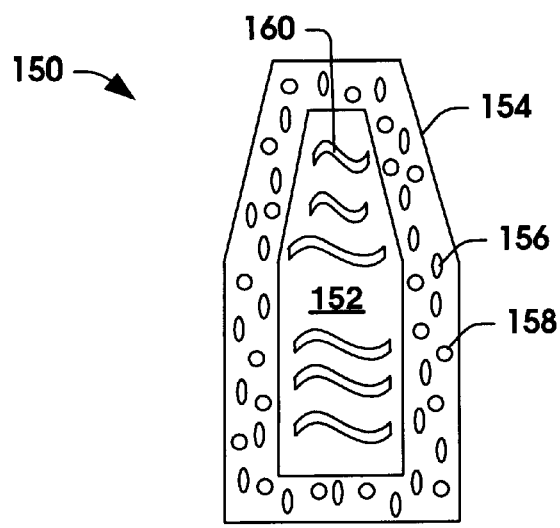
FIG. 7 illustrates an example configuration of a cross-sectional view of a jet vane having plume signature modifying materials with varying material types in accordance with an aspect of the present invention.

FIG. 7 illustrates an example configuration of a cross-sectional view of a jet vane 150 that modifies plume signature characteristics by varying the plume modifying material composition and types in the jet vane in accordance with another aspect of the present invention. The jet vane 150 includes an inner portion 152 coated with an outer portion 154. The inner portion 152 and the outer portion 154 formed from an ablative material and a plurality of additive particles and/or fibers that modify the plume signature. The outer portion 154 is fabricated with a composition of particles of a first type 156 and particles of a second type 158. The particles of the first type 156 and the particles of the second type 158 are both comprised of plume modifying material whose composition effects the plume signature differently than the particle types by themselves. The inner portion 152 is fabricated with a plurality of fiber strands 160 that are formed from a plume modifying material. The plume modifying materials disposed throughout the jet vane 150 ablate concurrently with the other materials forming the jet vane 150 during afterburning. The first type particles 156, the second type particles 158 and the fiber strands 160 each provide different effects to the radiant intensity associated with the plume signature. The material selected for the particles are based on the desired radiant intensity tailoring (e.g., enhancement, reduction, resonation) of the plume.

Figure 8:
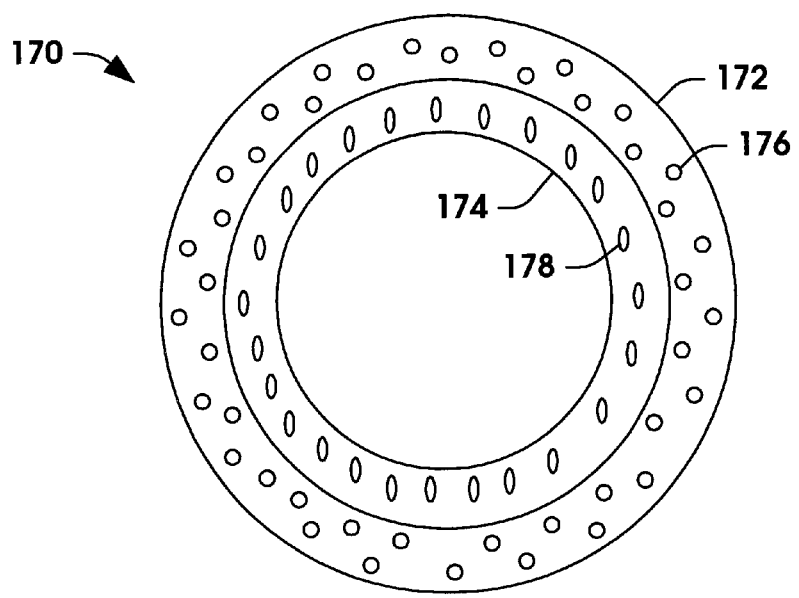
FIG. 8 illustrates an example configuration of a cross-sectional view of a material ring having plume signature modifying materials with varying material types in accordance with an aspect of the present invention.

FIG. 8 illustrates an example configuration of a cross-sectional view of a block or ring of material 170 that is mountable at a location within or near the exhaust plume during afterburning. The ring 170 is comprised of plume modifying materials that adjust plume signature characteristics. The ring 170 is formed of an outer layer 172 and an inner layer 174. The outer layer 172 and the inner layer 174 are formed from an ablative material and a plurality of additive particles and/or fibers that modify the plume signature. The outer layer 172 is fabricated with plume modifying particles of a first type 176, while the inner layer 174 is fabricated with plume modifying particles of a second type 178. The plume modifying materials disposed throughout the ring 170 ablate concurrently with the other materials forming the jet vane during afterburning. The first type particles 176 and the second type particles 178 provide different effects to the radiant intensity associated with the plume signature. The material selected for the particles of the first and second types are based on the desired radiant intensity tailoring (e.g., enhancement, reduction, resonation) of the plume.

Figure 9:
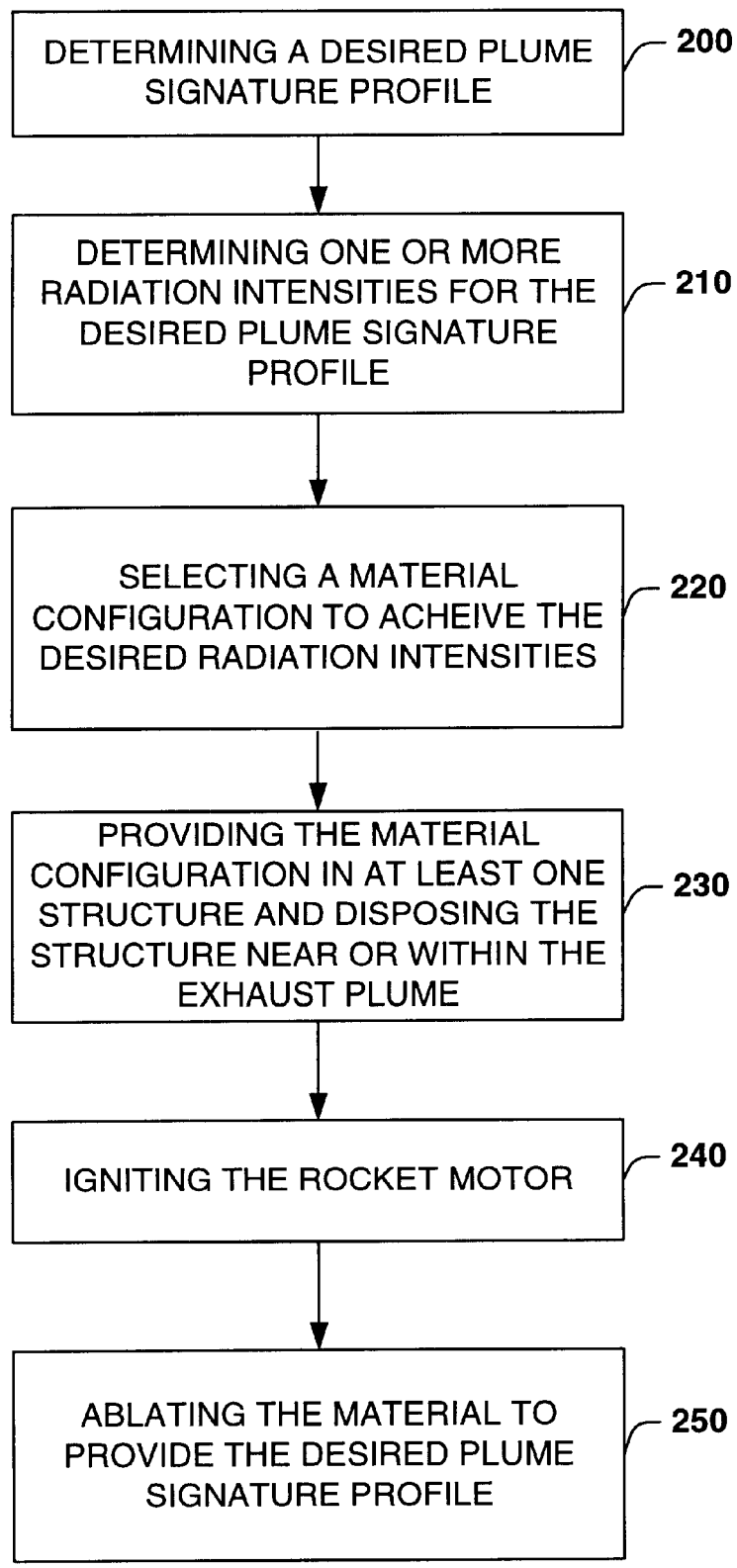
FIG. 9 illustrates a flow diagram of a methodology for tailoring a plume signature in accordance with an aspect of the present invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 9 illustrates a methodology for tailoring an exhaust plume signature in accordance with an aspect of the present invention. At 200, a desired plume signature profile is determined. For example, if the implementation is a target vehicle in which it is desired to simulate the exhaust plume of an actual rocket or missile type, a desired plume signature profile for the actual rocket or missile is determined. At 210, one or more radiation intensities corresponding to the desired plume signature profile are determined. The radiation intensities can vary over the operation of the rocket exhaust system. The radiation intensities can also vary over the length of a flight pattern. The methodology then advances to 220.

At 220, a material configuration is selected to achieve the desired radiation intensities. For example, the material configuration can be selected based on an ablation gradient. The material configuration can include selecting at least one of material type, density, composition, density, geometry and ablation rates for the plume modifying material according to a desired ablation gradient. At 230, the material configuration is provided into at least one structure disposed near or within the exhaust plume during afterburning. For example, the material configuration can be integrated into an ablative nozzle liner, jet vanes of a rocket and/or a structure placed near or within the exhaust plume. The methodology then proceeds to 240. At 240, the rocket motor is ignited. At 250, the material ablates during rocket operation to provide the desired plume signature profile.

It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for tailoring a plume signature of a rocket exhaust, the system comprising:
    a rocket engine system that provides a rocket exhaust plume upon ignition of the rocket engine system; and
    a structure having a plume signature modifying material that ablates into the rocket exhaust plume and modifies the radiant intensity of the exhaust plume to achieve a desired plume signature.

2. The system of claim 1, the plume signature modifying material being integrated into a nozzle liner of a nozzle assembly of the rocket engine system.

3. The system of claim 1, the plume signature modifying material being integrated into at least one jet vane associated with the rocket engine system.

4. The system of claim 1, the plume signature modifying material being a separate structure from the rocket engine system and being located in one of a rocket nozzle of the rocket engine system and a position outside a rocket nozzle exit of the rocket nozzle.

5. The system of claim 4, the plume signature modifying material being fabricated in a ring of ablative material.

6. The system of claim 1, the plume signature modifying material being configured within the structure to define a plume profile.

7. The system of claim 6, the plume profile defining a plurality of radiant intensity states.

8. The system of claim 6, the configuration being based on at least one of material types, material compositions, material densities, material geometries and material ablation rates of the plume signature modifying material within the structure.

9. The system of claim 8, the plume profile being associated with an ablation gradient, the ablation gradient being defined by varying any of the at least one of material types, material compositions, material densities, material geometries and material ablation rates of the plume signature modifying material within the structure.

10. The system of claim 1, the plume signature modifying material being at least one of particles, plugs and fibers dispersed within the structure.

11. A fuel-propelled vehicle system comprising:
    a fuel supply;
    a combustion chamber for igniting fuel provided by the fuel supply; and
    a rocket exhaust system having a nozzle assembly that exhausts accelerated gases caused by the ignited fuel forming an exhaust plume, the nozzle assembly having a nozzle liner at least partially formed from at least one plume signature modifying material that ablates into the exhaust plume and modifies the radiant intensity of the exhaust plume to achieve a desired exhaust plume.

12. The system of claim 11, the at least one plume signature modifying material being integrated with an ablative insulator to form the nozzle liner.

13. The system of claim 11, the at least one plume signature modifying material being at least one of particles, plugs and fibers dispersed within the nozzle liner.

14. The system of claim 11, the at least one plume signature modifying material being at least one of magnesium, aluminum, magnesium-polytetrafluoroethylene and carbon.

15. The system of claim 11, the at least one plume signature modifying material being configured within the nozzle liner to define a plume profile based on at least one of material types, material compositions, material densities, material geometries and material ablation rates.

16. The system of claim 15, the at least one plume signature modifying material being configured within the nozzle liner based on an ablation gradient, the ablation gradient being defined by varying at least one of material types, material compositions, material densities, material geometries and material ablation rates of the at least one plum signature modifying material within the nozzle liner.

17. A system for tailoring a plume signature of a rocket exhaust of a target missile, the system comprising:
    means for providing a supply of propellant;
    means for combusting the propellant resulting in formation of a rocket exhaust plume from a rocket nozzle; and
    means for providing a plume modifying material into the rocket exhaust to modify the radiant intensity of the rocket exhaust plume to simulate a rocket exhaust plume of another vehicle type.

18. The system of claim 17, the means for providing a plume modifying material into the rocket exhaust comprising integrating the plume modifying material into a nozzle liner of the rocket exhaust.

19. A method for tailoring a plume signature of a rocket exhaust plume of a rocket exhaust system, the method comprising:
    determining a desired plume signature profile;
    selecting at least one plume modifying material for ablating into the rocket exhaust to achieve the desired plume signature profile; and disposing the selected plume modifying material at a location such that the plume modifying material ablates into the rocket exhaust during rocket operation.

20. The method of claim 19, further comprising determining a plurality of desired radiation intensities and selecting a material configuration to achieve the desired radiation intensities.

21. The method of claim 20, the selecting of a material configuration being based on defining an ablation gradient to achieve the desired plume signature profile.

22. The method of claim 21, the ablation gradient defined by varying at least one of material types, material compositions, material densities, material geometries and material ablation rates.

23. The method of claim 19, further comprising integrating the selected plume modifying material into a structure in the rocket exhaust system.

24. The method of claim 23, the structure comprising at least one of a nozzle liner and a jet vane.

25. The method of claim 19, the ablating of the selected plume modifying material causing one of enhancing, reducing and resonating the radiant intensity of the exhaust plume.

* * * * *